US012529389B2

(12) United States Patent
Decosne et al.

(10) Patent No.: US 12,529,389 B2
(45) Date of Patent: Jan. 20, 2026

(54) HYDROMECHANICAL DEVICE FOR SUPPLYING THE CHAMBERS OF A LINEAR RECEIVING CYLINDER, AND HYDRAULIC SYSTEM INCORPORATING SUCH A DEVICE

(71) Applicants: UNIVERSITE GRENOBLE ALPES, Saint-Martin-d'Hères (FR); INSTITUT POLYTECHNIQUE DE GRENOBLE, Grenoble (FR); CENTRE NATIONAL DE LA RECHERCHE SCIENTIFIQUE, Paris (FR)

(72) Inventors: Jean-Luc Decosne, Grenoble (FR); Laurent Debove, Saint Nazaire les Eymes (FR); Yannick Sieffert, Grenoble (FR)

(73) Assignees: UNIVERSITE GRENOBLE ALPES, Saint-Martin-d'Hères (FR); INSTITUT POLYTECHNIQUE DE GRENOBLE, Grenoble (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 18/724,536

(22) PCT Filed: Dec. 27, 2022

(86) PCT No.: PCT/FR2022/052511
§ 371 (c)(1),
(2) Date: Jun. 26, 2024

(87) PCT Pub. No.: WO2023/126614
PCT Pub. Date: Jul. 6, 2023

(65) Prior Publication Data

US 2025/0223980 A1 Jul. 10, 2025

(30) Foreign Application Priority Data

Dec. 29, 2021 (FR) ....................................... 2114618

(51) Int. Cl.
*F15B 13/04* (2006.01)
*F15B 13/044* (2006.01)
*F15B 15/14* (2006.01)

(52) U.S. Cl.
CPC ........ *F15B 13/0401* (2013.01); *F15B 13/044* (2013.01); *F15B 15/1438* (2013.01); *F15B 15/1457* (2013.01)

(58) Field of Classification Search
CPC .... F04B 5/02; F04B 9/02; F04B 17/03; F15B 7/005
See application file for complete search history.

(56) References Cited

U.S. PATENT DOCUMENTS 4,872,310 A * 10/1989 Kaye ....................... F15B 7/005 60/567
5,655,371 A * 8/1997 Chuang ................... F15B 7/005 60/545

(Continued)

FOREIGN PATENT DOCUMENTS

DE 10220406 A1 1/2003
DE 102020102378 A1 8/2020

(Continued)

OTHER PUBLICATIONS

International Search Report and Written Opinion dated May 24, 2023 in corresponding application No. PCT/FR2022/052511; with English partial translation and partial machine translation (total 26 pages).

*Primary Examiner* — Thomas E Lazo
(74) *Attorney, Agent, or Firm* — Seckel IP, PLLC

(57) ABSTRACT

The hydromechanical device (102) for supplying each of two opposing active chambers (vr1ca1, vr1ca2) of a double- (Continued)

acting receiving cylinder (vr1) for servo-controlled operation of at least one first output rod (vr1ts1, vr1ts2) INCLUDES: a first double-acting generating cylinder (vg1) INCLUDING a first movement input rod (vg1te1) which is rigidly connected to a first piston (vg1p1) that delimits two first opposing passive chambers (vg1cp1, vg1cp2), each of which is selectively connected to at least one of THE two opposing active chambers of the receiving cylinder (vr1); and an assembly (110) for driving the first rod (vg1te1) of the first generating cylinder (vg1), INCLUDING a movement-transforming screw-nut assembly (112, 114), one movement output component (114) of which is rigidly connected to the first rod (vg1te1) of the first generating cylinder (vg1) and the other movement input component (112) of which is rotated by a drive motor (m1).

18 Claims, 9 Drawing Sheets

(56) References Cited

U.S. PATENT DOCUMENTS

| | | | | |
|---|---|---|---|---|
| 6,298,941 | B1 * | 10/2001 | Spadafora | F15B 13/021 701/41 |
| 6,575,264 | B2 * | 6/2003 | Spadafora | F15B 13/021 701/41 |
| 6,817,859 | B2 * | 11/2004 | Dantlgraber | F15B 7/001 425/451.2 |
| 2003/0029325 | A1 | 2/2003 | Dantlgraber | |
| 2017/0122454 | A1 | 5/2017 | Baza Vazquez et al. | |

FOREIGN PATENT DOCUMENTS

| | | | |
|---|---|---|---|
| DE | 102020121456 | A1 | 2/2021 |
| JP | 2002295624 | A | 10/2002 |
| WO | 0154960 | A1 | 8/2001 |
| WO | 2011026944 | A1 | 3/2011 |

* cited by examiner

HYDROMECHANICAL DEVICE FOR SUPPLYING THE CHAMBERS OF A LINEAR RECEIVING CYLINDER, AND HYDRAULIC SYSTEM INCORPORATING SUCH A DEVICE

TECHNICAL FIELD OF THE INVENTION

The present invention relates to the supply of an actuator consisting of at least one double-action hydraulic linear receiving cylinder, a double rod being able to be used in particular. The invention relates to a hydromechanical device for generating pressurized liquid and to a system comprising such a generating device associated with a receiving cylinder, permitting servo-control of the displacement/position/force of the receiving cylinder.

TECHNICAL BACKGROUND

For the servo-control of an actuator consisting of a hydraulic cylinder, it is known to use hydraulic assemblies comprising a hydraulic unit for generating pressurized liquid comprising in particular a source of pressurized liquid consisting of a pump and complex control circuits based on the use of servo valves.

The complexity of such assemblies and of their control or operation is linked in particular to the characteristic values of the output forces that it is desired to be able to exert by means of the actuator.

For certain applications, for example the use of a hydraulic linear cylinder to apply high forces to a structure with controlled displacement speeds of the order of a few microns per second, the invention aims in particular to propose a novel pressure-generating device which makes it possible to carry out such applications.

SUMMARY OF THE INVENTION

The invention proposes a hydromechanical device for supplying pressurized liquid to each of two opposing active chambers of a double-action hydraulic linear receiving cylinder for servo-control of the position and/or displacement and/or speed and/or force of at least one first movement output rod of the hydraulic linear receiving cylinder, characterized in that the hydromechanical device comprises:

at least one first double-action hydraulic linear generating cylinder comprising a first movement input rod which is integral with a first piston which delimits two first opposing passive chambers each of which is able to be selectively connected to at least one of the two opposing active chambers of the hydraulic linear receiving cylinder; and an assembly for driving the first movement input rod of the first double-action hydraulic linear generating cylinder comprising a mechanical movement transformation assembly, in particular a screw-nut assembly, of which one movement output component is integral in axial translation with the first movement input rod of the first double-action hydraulic linear generating cylinder, and of which the other movement input component is driven in rotation by a drive motor.

According to other features of the invention:

the hydromechanical device comprises at least one second double-action hydraulic linear generating cylinder comprising a second movement input rod which is integral with a second piston which delimits two second opposing passive chambers, each of which is able to be selectively connected to at least one of the two opposing active chambers of the hydraulic linear receiving cylinder, and said movement output component is also integral in axial translation with the second movement input rod of the second double-action hydraulic linear generating cylinder, so as to axially drive said first input rod and said second input rod simultaneously and in opposite directions;

the hydromechanical device comprises at least: one third double-action hydraulic linear generating cylinder comprising a third movement input rod which is integral with a third piston which delimits two third opposing passive chambers each of which is able to be selectively connected to at least one of the two opposing active chambers of the hydraulic linear receiving cylinder; and a fourth double-action hydraulic linear generating cylinder comprising a fourth movement input rod which is integral with a fourth piston which delimits two fourth opposing passive chambers each of which is able to be selectively connected to at least one of the two opposing active chambers of the hydraulic linear receiving cylinder; said movement output component is also integral in axial translation with the third movement input rod of the third double-action hydraulic linear generating cylinder, so as to axially drive the first input rod and the third input rod simultaneously and in identical directions; said movement output component is also integral in axial translation with the fourth movement input rod of the fourth double-action hydraulic linear generating cylinder, so as to axially drive the second input rod and the fourth input rod simultaneously and in identical directions;

the drive motor is an electric motor associated with a mechanical reduction gear with a variable transmission ratio and/or a frequency variator;

it comprises: at least one double-action hydraulic linear receiving cylinder comprising at least one first movement output rod able to apply stresses to a structure; a hydromechanical device for supplying pressurized liquid to each of two opposing active chambers of the double-action hydraulic linear receiving cylinder for servo-control of the position and/or displacement and/or speed and/or force of the at least one first movement output rod of the hydraulic linear receiving cylinder; and a set of hydraulic ducts connecting the various associated chambers; and solenoid valves for controlling the circulation of the liquid through said hydraulic ducts;

it comprises a complementary hydraulic unit comprising a controlled source of pressurized liquid, the output of which is able to be selectively connected to at least one of the two opposing active chambers of the hydraulic linear receiving cylinder.

BRIEF DESCRIPTION OF THE FIGURES

Other features and advantages of the invention will become apparent from reading the following detailed description, for an understanding of which reference will be made to the appended drawings, in which.

DETAILED DESCRIPTION OF THE INVENTION

Figure 1:
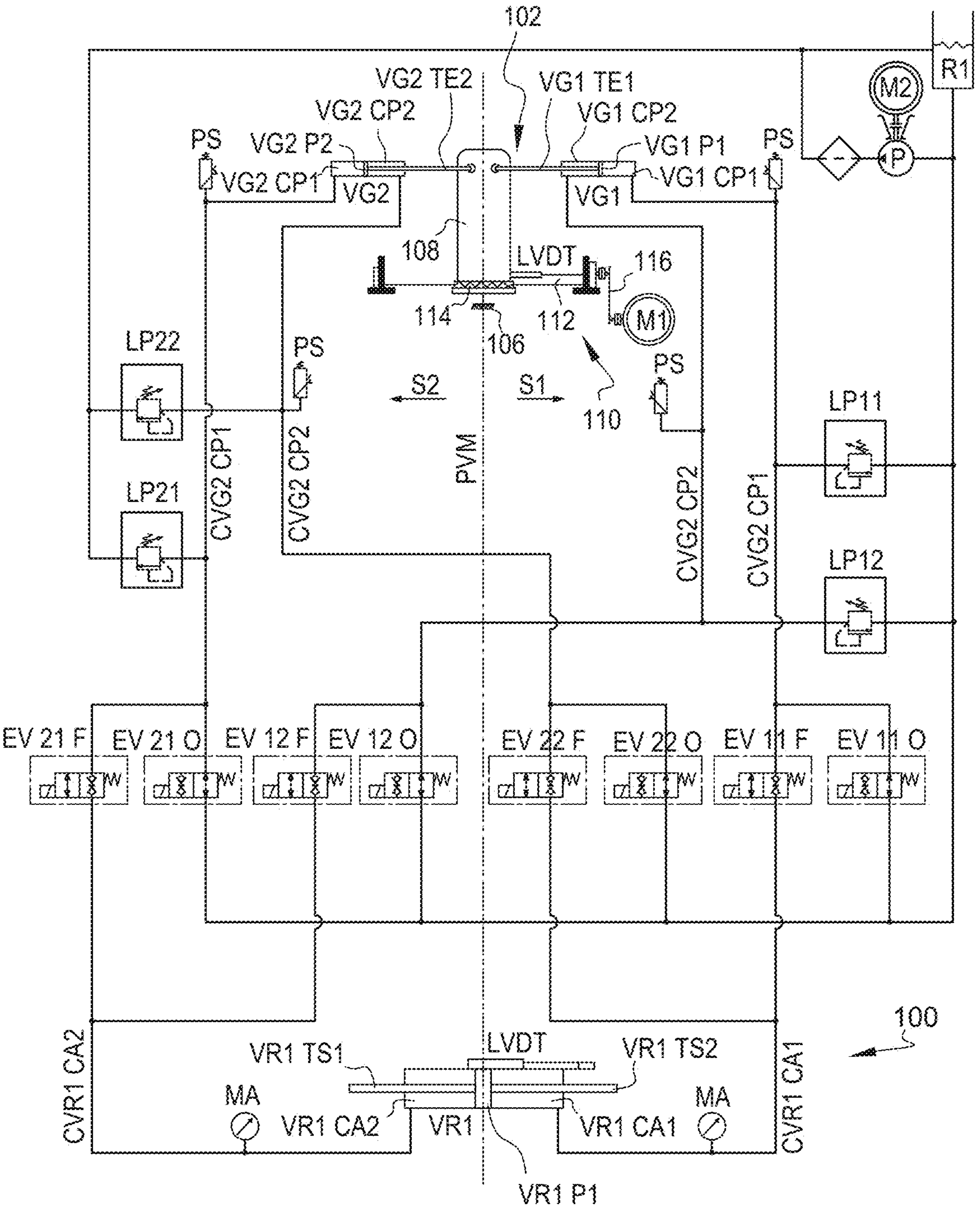
FIG. 1 is a schematic representation of a first example of a hydraulic system according to the invention comprising a hydromechanical device according to the invention.

For the description of the invention and the understanding of the claims, the vertical, longitudinal and transverse orientations will be adopted nonlimitingly, and without limiting reference to the gravitational field of the Earth, according to the frame of reference V, L, T indicated in the figures, in which the longitudinal axis L and transverse axis T extend in a horizontal plane.

By convention, the longitudinal axis L is oriented from the rear to the front.

In the following description, elements that are identical, similar or analogous will be denoted by the same reference numerals.

First "Standard" Embodiment of the Invention

FIG. 1 is a schematic representation of a hydraulic system 100 according to the invention which comprises a first embodiment of a hydromechanical device 102 with two "double-action, single-rod" cylinders generating flow and pressure for supplying liquid to a "double-action, double-rod" receiving cylinder.

The hydraulic system 100 and the hydromechanical device have a general symmetry of design and function along a vertical median plane PVM of FIG. 1.

The hydromechanical device 102 comprises two generating cylinders VG1 and VG2, each of which is here of the double-action type.

Each generating cylinder VG1, VG2 is of the single-rod type which, in the sense of the invention, is here a movement input rod which drives an associated piston in displacement. Thus, the first generating cylinder VG1 comprises a first movement input rod VG1TE1 which is integral with a first piston VG1P1 which, inside the cylinder, internally delimits two opposing passive chambers VG1CP1 and VG1CP2.

Due to the presence of the rod, the unit volume displaced by the piston VG1P1 in the chamber VG1CP1 is greater than the unit volume it displaces in the chamber VG1CP2. Similarly, the second generating cylinder VG2 comprises a second movement input rod VG2TE2 which is integral with a second piston VG2P2 which, inside the cylinder, delimits two opposing passive chambers VG2PC1 and VG2PC2.

Due to the presence of the rod, the unit volume displaced by the piston VG2P2 in the chamber VG2CP1 is greater than the unit volume it displaces in the chamber VG2CP2. Within the meaning of the invention, the chambers of the generating cylinders VG1 and VG2 are said to be "passive", in the sense that the liquid that they contain is displaced by the associated piston.

The axes of displacement of the two movement input rods VG1TE1 and VG2TE2 are here substantially parallel, and horizontal considering FIG. 1.

For driving the two movement input rods VG1TE1 and VG2TE2, each with respect to the cylinder body of the associated generating cylinder, the hydromechanical device 102 comprises a carriage 108 which is guided in sliding manner with respect to a fixed frame 106.

The free ends of the two movement input rods VG1TE1 and VG2TE2 are here connected in an articulated manner to the upper part of the carriage 108.

Thus, the horizontal displacement in one or other of the two directions S1, S2 of the carriage 108 with respect to the frame 106 causes a corresponding simultaneous displacement, in opposite directions, of the two movement input rods VG1TE1 and VG2TE2.

For driving the carriage 108 in both directions, the hydromechanical device 102 comprises a drive assembly 110 which comprises a mechanical movement transformation assembly which, by way of non-limiting example, is here a mechanism of the screw 112/nut 114 type.

The movement output component integral in axial translation with the carriage 108, and therefore with each of the two movement input rods VG1TE1 and VG2TE2, is here the nut 114 through which passes the movement input component, which is here the screw 112.

The screw/nut mechanism 112/114 is, for example, of the ball screw type.

For rotating the screw 112 in both directions, the assembly 110 here comprises an electric motor M1 which is for example a brushless motor equipped with an electronic speed variator which makes it possible to adjust the speed and torque, for example here by varying the frequency of the motor M1 supply current.

The output shaft of the electric motor M1 is connected in rotation to the screw 112 by means of a mechanical reduction gear 116 with variable transmission ratio.

By way of example, the motor M1 can rotate at 3400 rpm, and the combination of the frequency variator and of the mechanical reduction gear 116 makes it possible to vary the overall transmission ratio from 1 to 100, in association with a ball screw 112 with a pitch of 10 mm.

The translational movements of the nut 114, and therefore of the carriage 108, set in motion the two movement input rods VG1TE1 and VG2TE2 of the two double-action hydraulic generating cylinders mounted in opposition VG1 and VG2, by transforming the mechanical energy supplied by the drive assembly 110 into hydraulic energy.

In this example, the hydraulic system 100 here comprises a single double-action receiving cylinder VR1, of which the two opposing chambers are supplied by the hydromechanical supply device 102 with two generating cylinders VG1 and VG2.

The receiving cylinder VR1DT is of the double-rod type which, within the meaning of the invention, are each a movement output rod VR1TS1 and VR1TS2 and which are driven in displacement by the associated piston VR1P1 of the receiving cylinder VR1DT.

Thus, the receiving cylinder VR1DT comprises a piston VR1P1 which, inside the receiving cylinder VR1, delimits two opposing active chambers VR1CA1 and VR1CA2 having an identical volume.

Due to the presence of the two identical opposing rods, the unit volume displaced by the piston VR1P1 in the chamber VR1CA1 is equal to the unit volume that it displaces in the chamber VR1CA2.

Within the meaning of the invention, the opposing chambers VR1CA1 and VR1CA2 of the receiving cylinder VR1 are said to be "active" in the sense that the pressurized liquid that they receive displaces the associated piston VR1P1 in order to control the displacements of the two movement output rods VR1TS1 and VR1TS2.

Depending on the applications, it is possible to use one or the other of the two movement output rods VR1TS1 and VR1TS2 in order to apply mechanical stresses (traction and/or compression) to structural elements (not shown).

The maximum value of the output force of the drive assembly 110 corresponds to the maximum value of the force generated by the generating cylinders.

The ball screw 112 is dimensioned to take account of the forces to be transmitted.

In motion, the generating cylinders VG1 and VG2 inject or transfer a volume of pressurized liquid into the receiving cylinder VR1.

The speed of displacement of the pistons VG1P1 and VG2P2 of the generating cylinders VG1 and VG2 is proportional to the speed of rotation of the electric motor M1, the reduction ratio of the mechanical reduction gear 116 and the pitch of the ball screw 112.

The system self-regulates in displacement and supplies only the desired useful flow of pressurized liquid thanks to the frequency variator and to at least one displacement sensor such as an inductive sensor LVDT associated with the receiving cylinder VR1.

The system makes it possible to reduce the forces between the generating cylinders VG1 and VG2 and the receiving cylinder VR1, as a function of the ratios of the effective areas concerned of the pistons VG1P1, VG2P2 and VR1P1.

The hydraulic system thus behaves like a mechanical reduction gear, reducing the value of the force by decreasing the speed in proportion.

To compensate for the difference in the volumes displaced between the generating cylinders and the receiving cylinder, the solution lies in dimensioning the stroke of the generating cylinders VG1 and VG2 as a function of the stroke of the receiving cylinder VR1.

We will now describe all the other components of the system for the hydraulic connection of the various chambers of the three cylinders VG1, VG2 and VR1, and also for the control and operation of the system.

In addition to a hydraulic tank R1, these mainly entail a set of high-pressure hydraulic ducts or pipes for connecting the various chambers, and solenoid valves (EV) for controlling the circulation of the liquid through said hydraulic ducts.

The term solenoid valve used here is equivalent to the term distributor used in the nomenclature and the standardized representations of hydraulic or pneumatic circuits.

Eight electromagnetically controlled solenoid valves are provided here, each of which is of the 2-way/2-position type, each in the form of a switch implanted in a duct.

These include four solenoid valves EV11F, EV22F, EV12F, EV21F which are closed at rest and are open when controlled, and four solenoid valves EV11O, EV22O, EV12O and EV21O which are open at rest and are closed when controlled.

Each passive chamber VGiCPj of a generating cylinder VG1 comprises an orifice connected to an associated duct CVGiCPj.

Thus, for example, the second passive chamber VG2CP2 of the second generating cylinder VG2 is connected to a duct CVG2CP2.

Compensating for the compressibility (i.e. about 1% per 200 bar) of the liquid contained in the chambers of the pressurized cylinders requires the return chambers to be brought to atmospheric pressure, transferring their volumes of liquid without pressure in order to prevent them from being placed under vacuum. It is by selecting the solenoid valves connecting these chambers to the tank that this problem can be overcome by combining the return flow with a compensation flow.

To secure the maximum permissible pressure in the circuits, each of these ducts CVG1CP1, CVG1CP2, CVG2CP1 and CVG2CP2 is equipped with an adjustable and normally closed pressure limiter LP11, LP12, LP21 and LP22, respectively.

Each pressure limiter LPij is set to a value 20% higher than the setting value of the pressure sensor PS (which causes the system to stop when this value is reached or exceeded) associated with it.

The function of a pressure limiter LPij is an "extreme" safety function and should not in principle be used during normal operation.

Each active chamber VR1CA1, VR1CA2 of the receiving cylinder VR1 comprises an orifice which is connected to an associated duct CVR1CA1, CVR1CA2, respectively.

Each duct CVR1CA1, CVR is connected directly to a pair of solenoid valves EV11F-EV11O, EV21F, EV21O, respectively.

Finally, the system 100 comprises various measurement components such as pressure gauges MA and pressure sensors or pressure switches PS.

In the initial idle state of the system and of the solenoid valves, as shown in FIG. 1, it will be seen that each active chamber VR1CA1, VR1CA2 of the receiving cylinder does not communicate directly with the reservoir R1 or with any passive chamber, due to the closed state of the four solenoid valves EV11F, EV22F, EV12F, EV21F to which they are connected.

It will also be noted that all the chambers of the two generating cylinders VGI and VG2 are connected to the tank R1 via the four solenoid valves or electrodirectional valves EV11O, EV22O, EV12O, EV21O, the initial status of which authorizes the resetting of the cycle start positions of the two generating cylinders VG1 and VG2 in relation to the receiving cylinder VR1. This function makes it possible to compensate for the internal leaks in the system, in order to avoid accumulating them, the displacement of a desynchronization delta activating this function when passing through the initial state.

Operation of the First "Standard" Embodiment of the Invention

The device 100 shown in FIG. 1 is in an initial state in which the electric motor M1 is idle and each of the three cylinders VG1, VG2 and VR1 is also idle, for example each with its piston VG1P1, VG2P2 and VR1P1 in a central axial position halfway along the inside of the associated cylinder body and with its two opposing chambers balanced at atmospheric pressure.

Similarly, each solenoid valve is in its initial rest position (state 0), which it is able to leave in order to occupy its other actuated position (state 1).

In order, for example, to push the rod VR1TS1 out, to the left as seen in FIG. 1, so as to apply stress to a structure by means of this output rod, the active chamber VR1CA1 of the receiving cylinder VR1 must be supplied by injecting liquid into it, at a pressure proportional to the load that is to be displaced, with a controlled flow rate value.

To supply it from the hydromechanical device 102 with generating cylinders using the first generating cylinder VG1, the input rod VG1TE1 of this cylinder VG1 must be driven to the right to make it "retract" inside the cylinder body of the generating cylinder VG1, in order to move the piston VG1P1 in the same direction.

To supply it from the hydromechanical device 102 with generating cylinders using the second generating cylinder VG2, it is also necessary to drive the input rod VG1TE1 of the generating cylinder VG1 to the right in order to move the piston VG1P1 in the same direction.

To supply it from the hydromechanical device 102 with generating cylinders using simultaneously the first generating cylinder VG1 and the second generating cylinder, it is also necessary to drive the input rod VG1TE1 of this cylinder VG1 to the right in order to move the piston VG1P1 in the same direction.

To do this, it is necessary to drive the nut 114 by means of the screw 112, by driving the latter in the corresponding direction by means of the electric motor M1.

The displacement of the nut 114 to the right causes the corresponding displacement of the carriage 108 and therefore of the input rod VG1TE1 and of the piston VG1P1.

According to a first volume of oil returned, in order to bring the passive chamber VG1CP1 into communication with the first active chamber VR1CA1 of the receiving cylinder VR1, it is necessary to:

- control the solenoid valve EV11O so that it leaves its "open" rest position and reaches its active or actuated "closed" position;
- and control the solenoid valve EV11F so that it leaves its "closed" rest position and reaches its "open" active position.

By virtue of this combined control of the pair of solenoid valves EV11O and EV11F, the pressurized liquid then prevailing in the passive chamber VG1CP1 causes the pressure in the active chamber VR1CA1 to increase.

The other active chamber VR1CA2 is in communication with the chamber VG2CP1 by switching the solenoid valve EV21F to transfer the same volume of oil, and the solenoid valve EV21O compensates for compressibility by allowing a volume variation via the tank R1.

According to a second volume of oil returned, in order to bring the passive chamber VG2CP2 into communication with the first active chamber VR1CA1 of the receiving cylinder VR1, it is necessary to:

- control the solenoid valve EV22O so that it leaves its "open" rest position and reaches its "closed" active position;
- and control the solenoid valve EV22F so that it leaves its "closed" rest position and reaches its "open" active position.

By virtue of this combined control of the pair of solenoid valves EV22O and EV22F, the pressurized liquid then prevailing in the passive chamber VG2CP2 causes the pressure in the active chamber VR1CA1 to increase.

The other active chamber VG2CA2 is in communication with the pair of solenoid valves EV12O and EV12F connecting the return flow to the chamber VG2CP2 and the tank R1.

According to a third volume of oil returned, in order to bring the passive chamber VG1CP1 and the passive chamber VG2CP2 simultaneously into communication with the first active chamber VR1CA1 of the receiving cylinder VR1, it is necessary to:

- control the solenoid valve EV11O so that it leaves its "open" rest position and reaches its "closed" active position;
- control the solenoid valve EV11F so that it leaves its "closed" rest position and reaches its "open" active position;
- control the solenoid valve EV22O so that it leaves its "open" rest position and reaches its "closed" active position;
- and control the solenoid valve EV22F so that it leaves its "closed" rest position and reaches its "open" active position.

By virtue of this combined control of the four solenoid valves, the pressurized liquid then prevailing in the passive chamber VG1CP1 is then injected into the active chamber VR1CA1 and the pressurized liquid then prevailing in the passive chamber VG2CP2 is injected simultaneously into the active chamber VR1CA1.

The other active chamber VR1CA2 is in communication with EV12F, EV12O, EV21F, EV21O connecting the return flow to the chambers VG2CP1 and VG1CP2 and the tank R1.

Each of the three possible returned volumes (flow rates) corresponds to a maximum pressure value and a different displacement of one or both generating cylinders.

Thus, by controlling in particular the four solenoid valves EV11O, EV11F, EV12O and EV12F, it is possible, by means of the hydromechanical device 102, to supply receiving cylinder VR1 with the flow rate and single-acting pressure necessary for the phase of servo-control, in compression or traction, of the stress applied to a structure (not shown) by the first rod VR1TS1.

The solenoid valves EV11O, EV22O, EV12O and EV21O also allow the return circuits coming from the active chambers of the receiving cylinder VR1 to be brought to atmospheric pressure and allow the positions of each piston to be reset, particularly in the event of leaks. For this purpose, a measurement of the displacements between the generating cylinder(s) and the receiving cylinder(s) is carried out by means of displacement sensors LVDT in order to evaluate any drift between the starting positions. Depending on a predetermined maximum deviation setpoint, a reset requirement is identified. The principle then consists in immobilizing the generating cylinder(s) in position and then compensating for the observed drift by moving the generating cylinder(s) to their reference position, thus eliminating the observed offset.

With this exemplary embodiment, the possible servo-controls are: Force/Displacement/Speed/Position.

Depending on the dimensions of the various components, it is possible to obtain controlled displacements of the piston VR1PC1 of a few microns, regardless of the variations in the value of the force to be applied.

By symmetry, with a view, for example, to causing the rod VR1TS2 to extend to the right as seen in FIG. 1, so as to apply a stress to a structure by means of this output rod, it is necessary to supply the active chamber VR1CA2 of the receiving cylinder VR1.

The active chamber VR1CA2 is then supplied at three flow rates and three pressures by combining the control of the solenoid valves EV21O, EV21F, EV12O and EV12F.

TABLE 1

| Solenoid | Supply of VR1CA1 Rod VR1TS1 | | | Supply of VR1CA2 Rod VR1TS2 | | | Reset position VR1, VG1 and VG2 |
|---|---|---|---|---|---|---|---|
| valve (0 = rest) (1 = actuated) | 1st flow rate | 2nd flow rate | 3rd flow rate | 1st flow rate | 2nd flow rate | 3rd flow rate | Action to be performed at Force 0 |
| EV110 | 1 | 0 | 1 | 0 | 0 | 0 | 0 |
| EV11F | 1 | 0 | 1 | 1 | 0 | 1 | 0 |
| EV220 | 0 | 1 | 1 | 0 | 0 | 0 | 0 |
| EV22F | 0 | 1 | 1 | 0 | 1 | 0 | 0 |
| EV210 | 0 | 0 | 0 | 1 | 0 | 1 | 0 |
| EV21F | 1 | 0 | 1 | 1 | 0 | 1 | 0 |
| EV120 | 0 | 0 | 0 | 0 | 1 | 1 | 0 |
| EV12F | 0 | 1 | 1 | 0 | 1 | 1 | 0 |

The above table illustrates the position of each of the eight solenoid valves according to the active chamber of the receiving cylinder VR1 which is supplied, and according to the flow rate and supply pressure of this chamber.

Industrial Embodiment of the Hydromechanical Assembly 102

Figure 2:
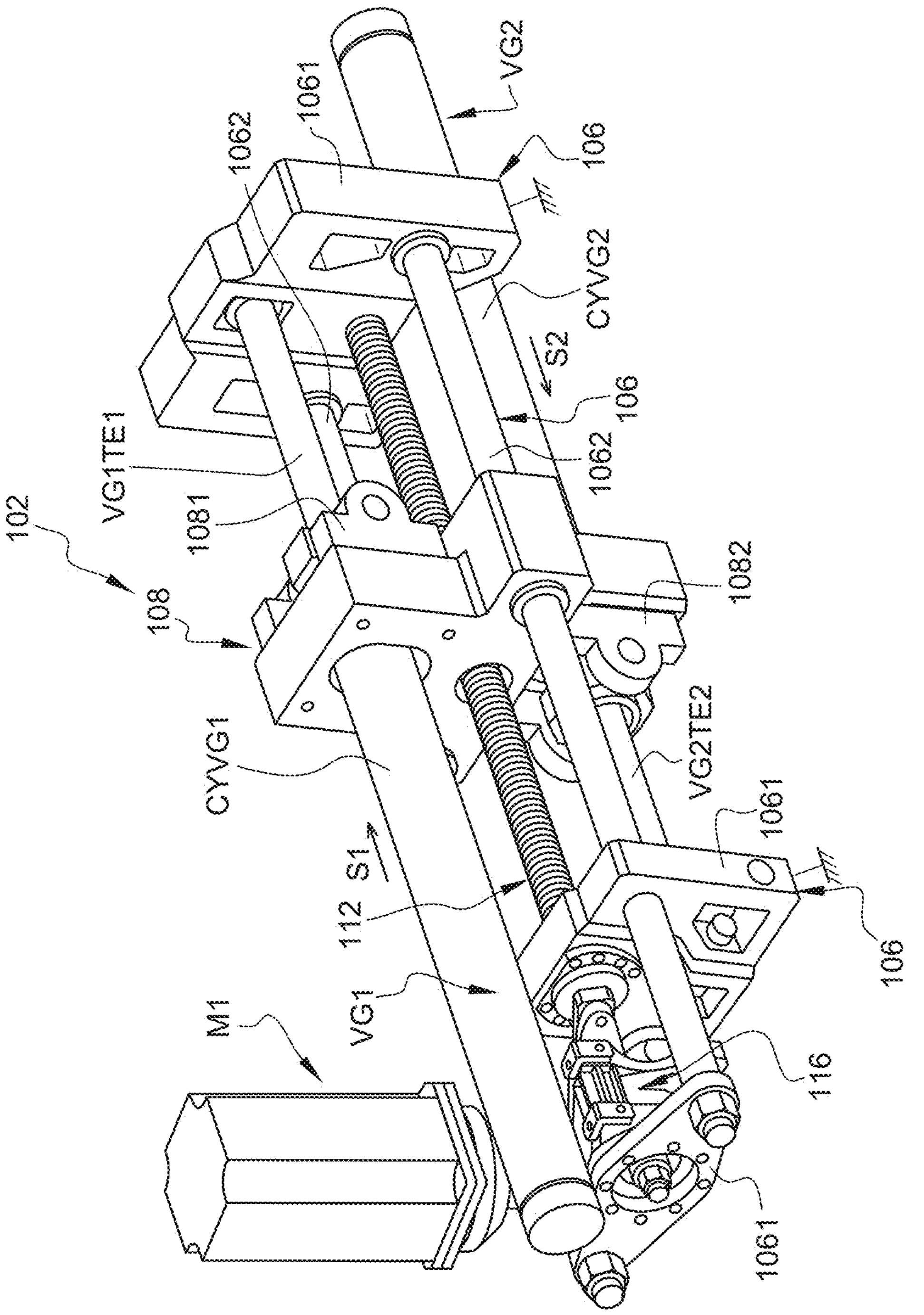
FIG. 2 is a perspective representation of an example of an industrial embodiment of the hydromechanical device of FIG. 1.

FIG. 2 shows an exemplary embodiment of a hydromechanical device 102 of the type described above with reference to the schematic representation given in FIG. 1.

All of the fixed components constituting the frame 106 are designated by the same general reference number 106.

The frame 106 is thus composed essentially of three fixed vertical and transverse yokes 1061 which are connected to one another by a pair of horizontal guide bars 1062.

The central carriage 108 is guided in a longitudinal sliding motion in both directions S1 and S2 on the two bars 1062, and it centrally houses the nut (not visible in FIG. 2).

In this embodiment, it is the cylinder body CYVG1, CYVG2 of each generating cylinder VG1, VG2 that is connected in an articulated manner to the sliding mobile carriage 108 by means of an articulation yoke 1081, 1082.

Thus, for example, when the carriage 108 is driven in the direction indicated by the arrow S1, it drives the cylinder CYVG1 and the rod VG1TS1 "retracts" inside the cylinder CYVG1.

Conversely, when the carriage 108 is driven in the direction indicated by the arrow S2, it drives the cylinder CYVG2 and the rod VG1TS2 "retracts" inside the cylinder CYVG2.

Second "Simplified Standard" Exemplary Embodiment of the Invention

Figure 3:
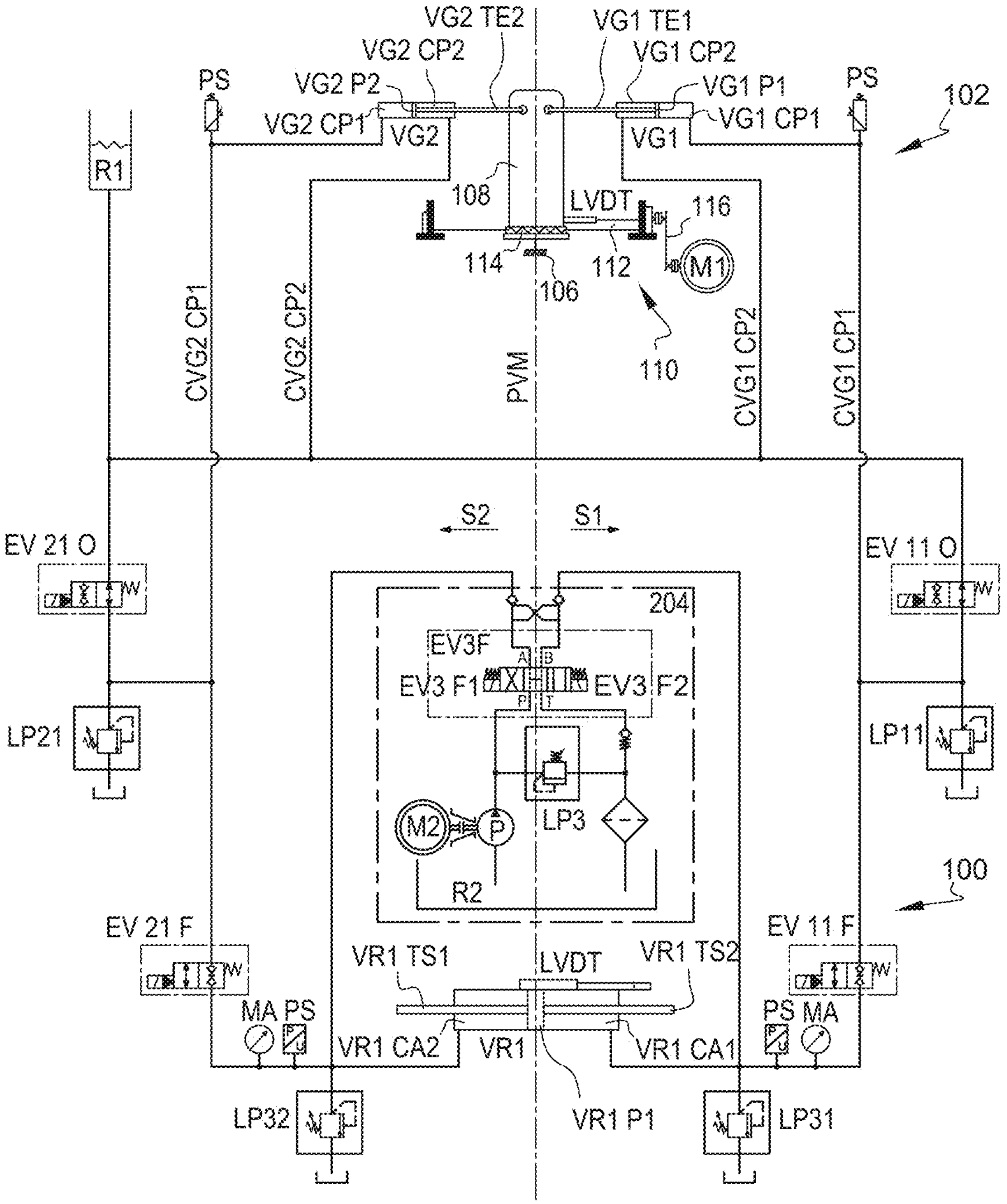
FIG. 3 is a schematic representation of a second example of a hydraulic system according to the invention comprising a hydromechanical device according to the invention.

By comparison with the first standard example, in the simplified standard example shown in FIG. 3, the hydromechanical device 102 is identical and comprises in particular two double-action generating cylinders VG1 and VG2, and an identical drive assembly 110.

On the other hand, all the other components of the system for hydraulically connecting the various chambers of the three cylinders VG1, VG2 and VR1, and also for control of the system, are simplified in that they comprise only four 2-way/2-position solenoid valves. This design makes it possible to supply each of the active chambers VR1CA1 or VR1CA2 of the receiving cylinder VR1 with only one "maximum" flow rate value coming from the first passive chamber VG1CP1 of the first generating cylinder VG1 or from the first passive chamber VG2CP1 of the second generating cylinder VG2.

An additional hydraulic unit 204, of conventional design, makes it possible to carry out phases of rapid displacements in both directions, and also the resetting of the various initial positions and states of the entire system 100.

The hydraulic unit 204 comprises a tank R2 in which there aspirates a pump P driven by an electric motor M2. The output of the pump P is connected to an inlet port of a control solenoid valve EV3F.

The solenoid valve EV3F is of the 4-way/3-position type which is a normally closed switch and which is able to be controlled to either of two opposite active positions.

The hydraulic unit 204 can be controlled and operated by varying the value of the output pressure of the pump P in a controlled manner and/or by controlling the solenoid valve EV3F between its central "closed" rest position and either of its two opposite "open" active positions, in each of which it permits the supply of pressurized liquid to one of the two active chambers VR1CA1 (or VR1CA2), and simultaneously the placing in communication of the other VR1CA2 (or VR1CA1) of the two active chambers from the tank R2.

During these phases of use of the hydraulic unit 204, the solenoid valves EV11F and E21F are at rest in the closed position.

Each duct CVR1CA1 and CVR1CA2 is equipped with an adjustable and normally closed pressure limiter LP31, LP32, respectively.

Each pressure limiter LPij is set to a value 20% higher than the setting value of the pressure sensor PS (which causes the system to stop when this value is reached or exceeded) associated with it.

Thus, the supply of liquid to each of the two active chambers VR1CA1, VR1CA2 can be effected by means of a "mixed" supply system comprising the hydromechanical device 102 with cylinder and the hydraulic unit 204 with pump P.

TABLE 2

| Solenoid valve (0 = rest) (1 = actuated) | Supply of VR1CA1 Rod VR1TS1 Regulated flow rate | Supply of VR1CA2 Rod VR1TS2 Regulated flow rate | Reset position |
|---|---|---|---|
| EV11O | 1 | 0 | |
| EV11F | 1 | 1 | 0 |
| EV21O | 0 | 1 | 0 |
| EV21F | 1 | 1 | 0 |

TABLE 2-continued

| | | | |
|---|---|---|---|
| EV3F1 | 0 | 0 | 0 |
| EV3F2 | 0 | 0 | 0 |

| Solenoid valve (0 = rest) (1 = actuated) | Supply of VR1CA1 for rapid displacement of rod VR1TS1 | Supply of VR1CA2 for rapid displacement of rod VR1TS2 |
|---|---|---|
| EV3F | 1 (activated to the right) | |
| EV3F | | 1 (activated to the left) |
| EV11F | 0 | |
| EV21F | 0 | |

The above table illustrates the position of each of the four control solenoid valves and of the solenoid valve EV3F according to the active chamber of the receiving cylinder VR1 that is supplied and to the pressure source used.

This diagram permits a reduced dimensioning of the volume injection system by providing only the double-action flow rate (pressure) required for the servo-control phases (in compression or traction).

The hydraulic unit 204 ensures the rapid approach and retreat phases and the resetting of the system positions.

This simplified standard example makes it possible to carry out all the bidirectional servo-controls.

Third "Simplified Non-Symmetrical Standard" Embodiment of the Invention

Figure 4:
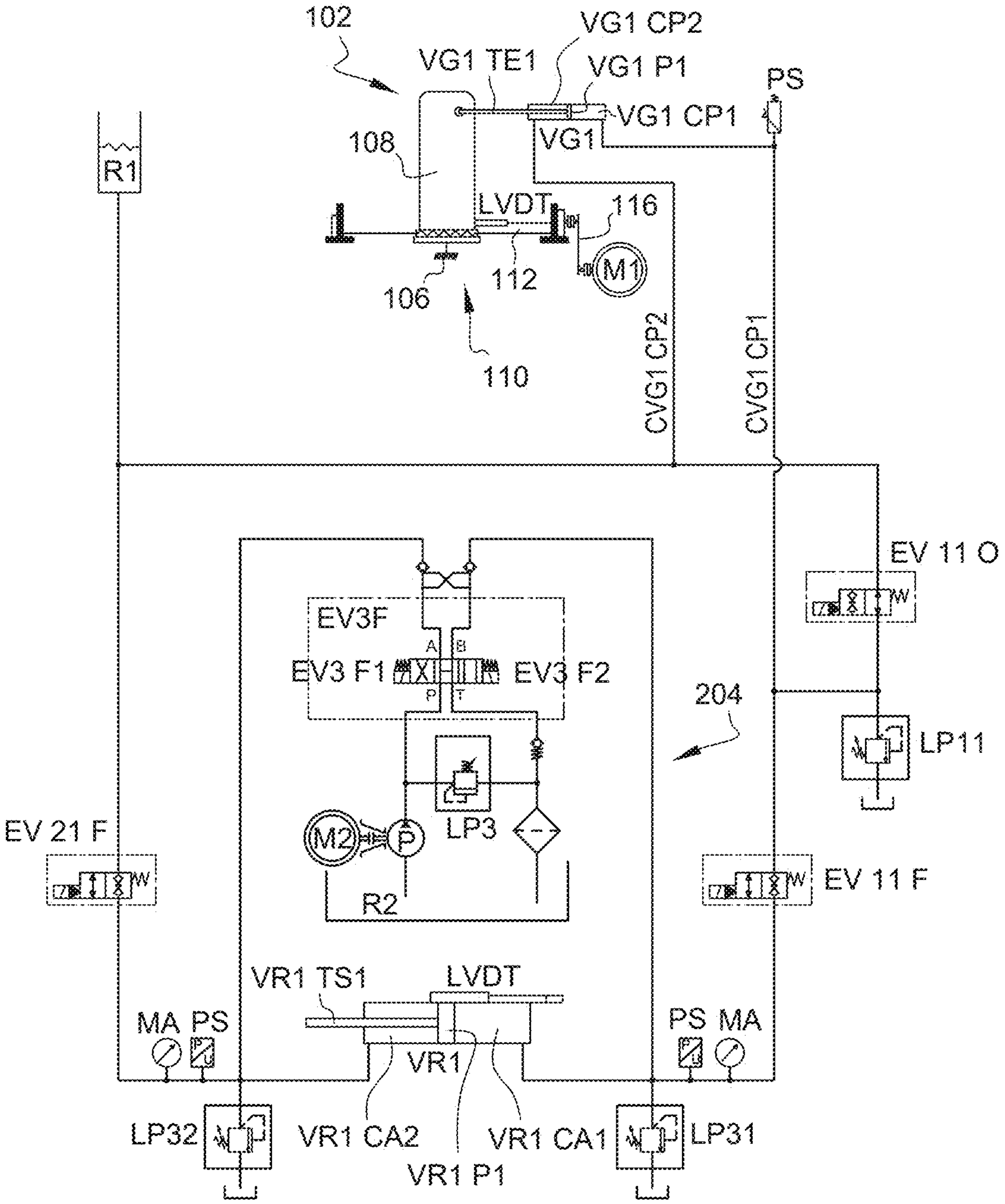
FIG. 4 is a schematic representation of a third example of a hydraulic system according to the invention comprising a hydromechanical device according to the invention.

By comparison with the second simplified standard example, in this simplified non-symmetrical standard example shown in FIG. 4, the hydromechanical device 102 is of overall similar design, but it comprises only one double-action generating cylinder VG1 which is capable of injecting liquid in a controlled manner only into the first active chamber VR1CA1 of the receiving cylinder VR1.

The hydromechanical device 102 comprises a drive assembly 110 for driving the input rod VG1TE1 identical to the device 102 described above.

The system 100 comprises a hydraulic unit 204 identical to the one provided in the second "simplified standard" embodiment.

Overall, this example permits a reduced dimensioning of the volume injection system in the receiving cylinder by providing only the flow rate and the single-action pressure necessary for the servo-control phase.

TABLE 3

| Solenoid valve (0 = rest) (1 = actuated) | Supply of VR1CA1 Rod VR1TS1 Max. flow rate | VG1 reset at each cycle 0 |
|---|---|---|
| EV11O | 1 | 0 |
| EV11F | 1 | 0 |
| EV21F | 1 | 0 |
| EV3F1 | 0 | 0 |
| EV3F2 | 0 | 0 or 1 |
| EV3F | 0 | 0 |

| Solenoid valve (0 = rest) (1 = actuated) | Supply of VR1CA1 for rapid displacement of rod VR1TS1 | Supply of VR1CA1 for rapid retreat of rod VR1TS1 |
|---|---|---|
| EV3F1 | 1 (activated to the right) | 0 (activated to the left) |
| EV3F2 | 0 | 1 |
| EV11F | 0 | 0 |
| EV21F | 0 | 0 |

The above table above illustrates the position of each of the four control solenoid valves and of the solenoid valve EV3F according to the active chamber of the receiving cylinder VR1 that is supplied and to the pressurized liquid injection source that is used.

This diagram permits a reduced dimensioning of the volume injection system by providing only the double-action flow rate (pressure) required for the servo-control phases (in compression or traction).

The hydraulic unit 204 ensures the rapid approach and retreat phases and the resetting of the system positions.

This simplified, non-symmetrical standard example makes it possible to carry out all the bidirectional servo-controls.

According to a symmetrical design (not shown), it would be possible to provide the hydromechanical device 102 with a single second generating cylinder VG2 in order to supply the second active chamber VR1CA2 of the receiving cylinder VR in a controlled manner.

Fourth "Symmetrical Enriched Standard" Embodiment of the Invention

Figure 5:
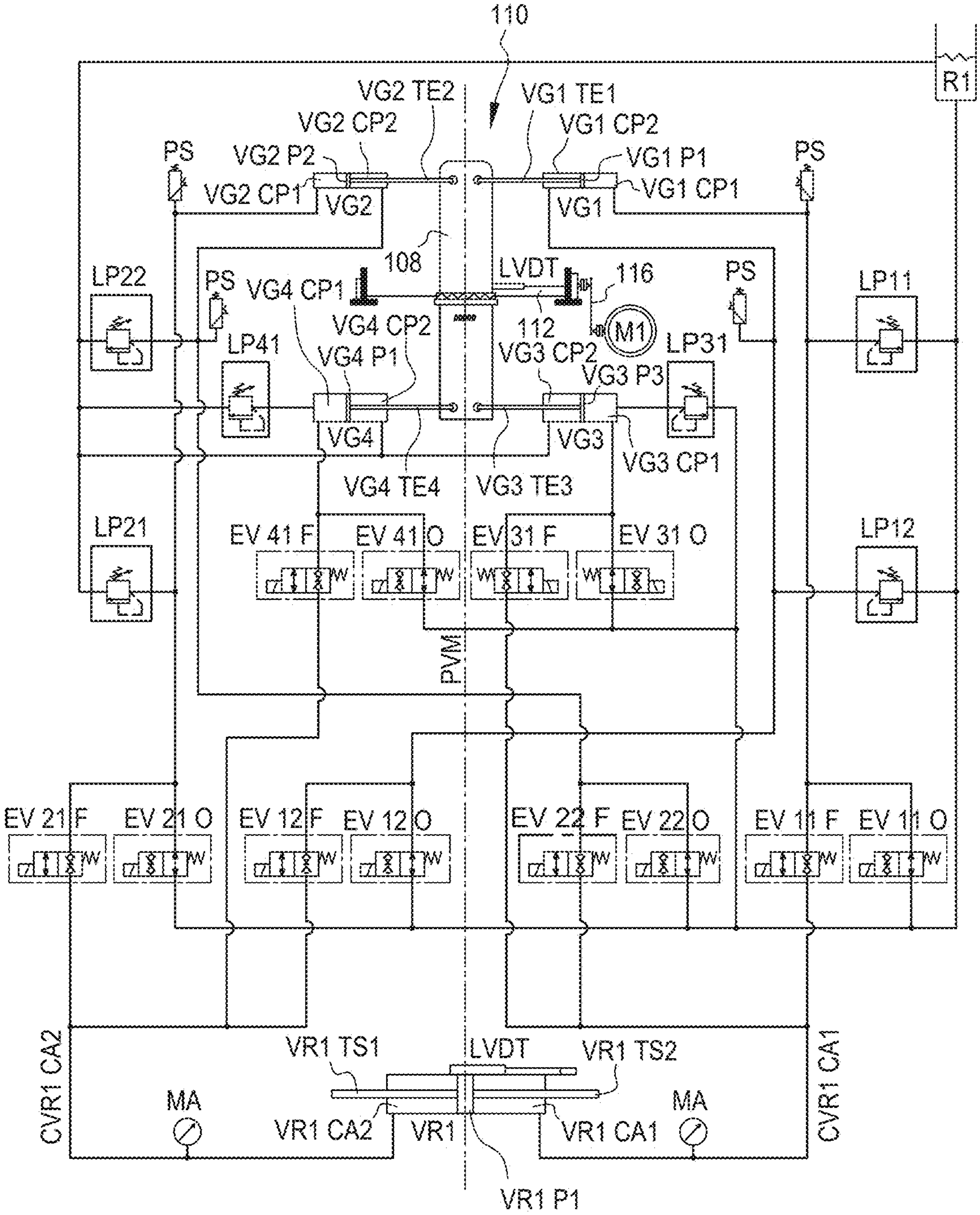
FIG. 5 is a schematic representation of a fourth example of a hydraulic system according to the invention comprising a hydromechanical device according to the invention.

By comparison with the first standard embodiment, FIG. 5 is a schematic representation of a hydraulic system 100 according to the invention which comprises another exemplary embodiment of a hydromechanical supply device 102 with four generating cylinders, including:

- a pair of generating cylinders VG1 and VG2, each with two passive chambers, which are identical to those of the first embodiment and which are also driven and connected in a manner identical to that of this first embodiment;
- and a second pair of additional generating cylinders VG3 and VG4.

Within the meaning of the invention, each generating cylinder VG3, VG4 is of the single-rod type which, within the meaning of the invention, is here a movement input rod which drives an associated piston in displacement.

Thus, the third generating cylinder VG3 comprises a third movement input rod VG3TE3 which is integral with a first piston VG3P3 which, inside the cylinder, internally delimits a third passive chamber VG3CP1.

The effective area of the third piston VG3P3 is greater than that of the piston VG1P1, and the unit volume displaced by the piston VG3P3 in the chamber VG3CP1 is thus greater than the unit volume displaced by the piston VG1P1 in the chamber VG1CP1.

Similarly, the fourth generating cylinder VG4 comprises a fourth movement input rod VG4TE4 which is integral with a fourth piston VG4P4 which, inside the cylinder, internally delimits a fourth passive chamber VG4CP1.

The effective area of the piston VG4P4 is greater than that of the piston VG2P2, and the unit volume displaced by the piston VG4P4 in the chamber VG4CP1 is thus greater than the unit volume displaced by the piston VG2P2 in the chamber VG2CP1.

The axes of displacement of the two movement input rods VG3TE3 and VG4TE4 are here substantially parallel, horizontal when considering FIG. 1.

For driving the two movement input rods VG3TE3 and VG4TE4 each with respect to the cylinder body of the associated generating cylinder, the free ends of the two movement input rods VG3TE3 and VG4TE4 are here connected in an articulated manner to the lower part of the carriage 108 of the hydromechanical device 102.

Thus, the horizontal displacement, in one or other of the two directions S1 or S2, of the carriage 108 causes a corresponding simultaneous displacement, in opposite directions, either of the two movement input rods VG1TE1 and VG3TE3 or of the two movement input rods VG2TE2 and VG4TE4.

Here, the hydraulic system 100 and the hydromechanical device again have a general symmetry of design and of function along a vertical median plane PVM of the figure.

Twelve electromagnetically controlled solenoid valves are provided here, each of which is of the 2-way/2-position type, each being in the form of a switch implanted in a duct.

Among them, in addition to the eight solenoid valves described in relation to the first standard embodiment for controlling the supply from the passive chambers of the two generating cylinders VG3 and VG4, there are two additional solenoid valves EV31F and EV41F, which are closed at rest and are open when actuated, and two additional solenoid valves EV31O and EV41O, which are open at rest and are closed when actuated.

Each passive chamber VG3CP1, VG4CP1 of a generating cylinder VG3, VG4 comprises an orifice connected to an associated duct CVG3CP1, CVG4CP1, respectively.

To compensate for the compressibility of the liquid between the different cylinders, each of these ducts CVG3CP1, CVG4CP1 is fitted with an adjustable and normally closed pressure limiter LP31, LP41, respectively.

Each pressure limiter LPij is set to a value 20% higher than the setting value of the pressure sensor PS (which causes the system to stop when this value is reached or exceeded) associated with it.

In the initial idle state of the system and of the solenoid valves, as shown in FIG. 5, it will be seen that each active chamber VR1CA1, VR1CA2 of the receiving cylinder does not communicate directly with the tank R1 or with any passive chamber, due to the closed state at rest of the six solenoid valves EV11F, EV22F, EV12F, EV21F, EV31F and EV41F to which they are connected.

This embodiment permits, for example, supply according to four values of flow rate and pressure of the active chamber VR1CA2, which is then obtained by combining the control of the solenoid valves EV21O, EV21F, EV12O and EV12F.

TABLE 4

| Solenoid valve (0 = rest) (1 = actuated) | Supply of VR1CA1 Rod VR1TS1 | | | | Supply of VR1CA2 Rod VR1TS2 | | | | Reset VG1, 2, 3, 4 and VR1 |
|---|---|---|---|---|---|---|---|---|---|
| | 1st flow rate | 2nd flow rate | 3rd flow rate | 4th flow rate | 1st flow rate | 2nd flow rate | 3rd flow rate | 4th flow rate | |
| EV110 | 1 | 0 | 1 | 1 | 0 | 0 | 0 | 0 | 0 |
| EV11F | 1 | 0 | 1 | 1 | 1 | 0 | 1 | 1 | 0 |
| EV220 | 0 | 1 | 1 | 1 | 0 | 0 | 0 | 0 | 0 |
| EV22F | 0 | 1 | 1 | 1 | 0 | 1 | 1 | 1 | 0 |
| EV210 | 0 | 0 | 0 | 0 | 1 | 0 | 1 | 1 | 0 |
| EV21F | 1 | 0 | 1 | 1 | 1 | 0 | 1 | 1 | 0 |
| EV120 | 0 | 0 | 0 | 0 | 0 | 1 | 1 | 1 | 0 |
| EV12F | 0 | 1 | 1 | 1 | 0 | 1 | 1 | 1 | 0 |
| EV310 | 0 | 0 | 0 | 1 | 0 | 0 | 0 | 0 | 0 |
| EV31F | 0 | 0 | 0 | 1 | 0 | 0 | 0 | 1 | 0 |
| EV410 | 0 | 0 | 0 | 0 | 0 | 0 | 0 | 1 | 0 |
| EV41F | 0 | 0 | 0 | 1 | 0 | 0 | 0 | 1 | 0 |

The above table is a non-limiting example which illustrates the position of each of the twelve solenoid valves according to the active chamber of the receiving cylinder VR1 which is supplied, and according to the supply flow rate.

With a hydromechanical device 102 for injection of pressurized liquid and with four generating cylinders, this fourth embodiment makes it possible to provide the flow rate and pressure values necessary for the servo-control phases (in compression or traction) and those of rapid approach and retreat (using the third and fourth generating cylinders), and also the resetting of the system positions. It replaces a mixed volume injection system combining a conventional hydraulic unit as described above. This system makes it possible to carry out all the rapid or slow bidirectional servo-controls.

Fifth "Improved Standard Embodiment with Simplified Distribution" of the Invention In this improved standard example with simplified distribution, the hydromechanical device 102 comprises in particular two double-action generating cylinders VG1 and VG2 and two additional single-action generating cylinders VG3 and VG4, and a drive assembly 110 similar to that described with reference to FIG. 5.

The hydromechanical supply device 102 comprises four generating cylinders, including:

- a pair of generating cylinders VG1 and VG2;
- and a second pair of additional generating cylinders VG3 and VG4.

Within the meaning of the invention, each generating cylinder VGi is of the single-rod type which, within the meaning of the invention, is here a movement input rod which drives an associated piston in displacement.

Thus, each generating cylinder VG1, VG2, VG3, VG4 comprises a movement input rod VG1TE1, VG2TE2, VG3TE3, VG4TE4 which is integral with a piston VG1P1, VG2P2, VG3P3, VG1P4 which, inside the cylinder, internally delimits a passive chamber VG1CP1, VG2CP1, VG3CP1, VG4CP1.

The effective area of the piston VG3P3 is greater than that of the piston VG1P1, and the unit volume displaced by the piston VG3P3 in the chamber VG3CP1 is thus greater than the unit volume displaced by the piston VG1P1 in the chamber VG1CP1.

The effective area of the piston VG4P4 is greater than that of the piston VG2P2, and the unit volume displaced by the piston VG4P4 in the chamber VG4CP1 is thus greater than the unit volume displaced by the piston VG2P2 in the chamber VG2CP1.

The axes of displacement of the two movement input rods VG3TE3 and VG4TE4 are here substantially parallel, horizontal when considering FIG. 1.

As in the example shown in FIG. 5, for driving the two movement input rods VG3TE3 and VG4TE4 (each with respect to the cylinder body of the associated generating cylinder), the free ends of the two movement input rods VG3TE3 and VG4TE4 are here connected in an articulated manner to the lower part of the carriage 108 of the hydromechanical device 102. Thus, the horizontal displacement, in one or other of the two directions S1 or S2, of the carriage 108 causes a corresponding simultaneous displacement, in opposite directions, either of the two movement input rods VG1TE1 and VG3TE3 or of the two movement input rods VG2TE2 and VG4TE4.

Here, the hydraulic system 100 and the hydromechanical device 102 again have a general symmetry of design and of function with respect to a vertical median plane PVM of the figure. All the other components of the system for hydraulically connecting the various chambers of the five cylinders VG1, VG2, VG3, VG4 and VR1, and also for control of the system, are simplified in that they here comprise only six 2-way/2-position solenoid valves.

This design makes it possible to supply each of the active chambers VR1CA1 or VR1CA2 of the receiving cylinder VR1 with a minimum flow rate value originating from the passive chamber VG1CP1 of the first generating cylinder VG1 or from the passive chamber VG2CP1 of the second generating cylinder VG2, or else a maximum flow rate value originating from the passive chamber VG3CP1 of the third generating cylinder VG3 or from the passive chamber VG4CP1 of the fourth generating cylinder VG4.

In particular, to control the connection of the passive chamber VG3CP1 of the third generating cylinder VG3 or the passive chamber VG4CP1 of the fourth generating cylinder VG4, the orifice of each of these two chambers is connected to an inlet of a solenoid valve EV31F, EV41F, each of which is of the 3-way/2-position type and which, in its rest position, closes the communication between the associated passive chamber and the receiving cylinder VR1.

TABLE 5

| Solenoid valve | Supply of VR1CA1 Rod VR1TS1 | | Supply of VR1CA2 Rod VR1TS2 | | Reset VG1, 2, |
|---|---|---|---|---|---|
| (0 = rest) (1 = actuated) | 1st flow rate | 2nd flow rate | 1st flow rate | 2nd flow rate | 3, 4 and VR1 |
| EV11O | 1 | 1 | 0 | 0 | 0 |
| EV11F | 1 | 1 | 1 | 1 | 0 |
| EV21O | 0 | 0 | 1 | 1 | 0 |
| EV21F | 1 | 1 | 1 | 1 | 0 |
| EV31F | 0 | 1 | 0 | 1 | 0 |
| EV41F | 0 | 0 | 0 | 1 | 0 |

The above table is a non-limiting example which illustrates the position of each of the six solenoid valves according to the active chamber of the receiving cylinder VR1 which is supplied, and according to the flow rate and pressure of the supply liquid injected into the receiving cylinder VR1.

Figure 6:
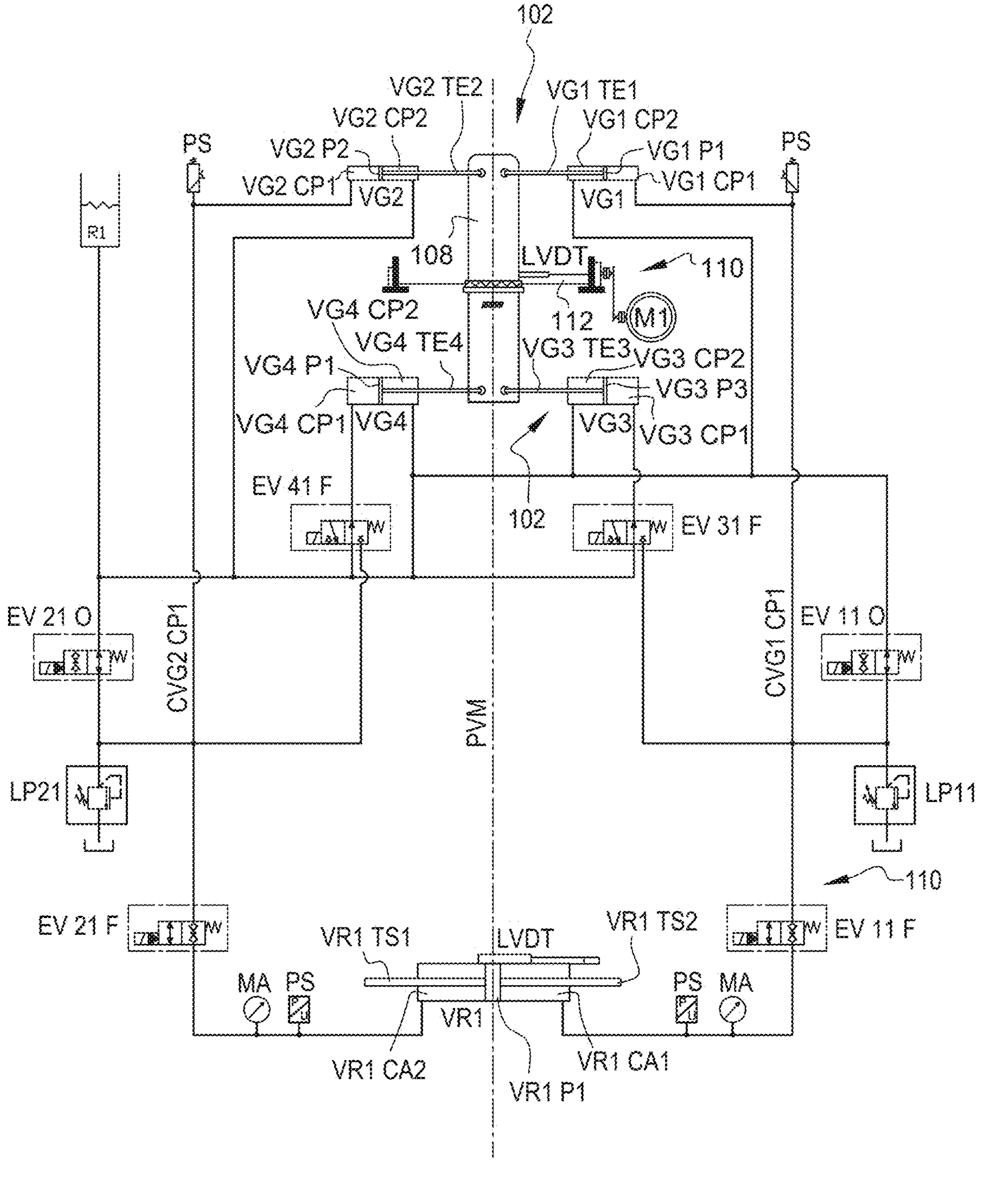
FIG. 6 is a schematic representation of a fifth example of a hydraulic system according to the invention comprising a hydromechanical device according to the invention.

The improved standard diagram with simplified distribution shown in FIG. 6 permits supply to each of the two active chambers of the receiving cylinder VR1 at two different flow rate and pressure values, including a minimum flow rate (1st flow rate) and a maximum flow rate (2nd flow rate).

The phases of rapid approach and retreat are ensured by means of the maximum flow rate. This simplified standard example makes it possible to carry out all the bidirectional servo-controls.

Figure 7:
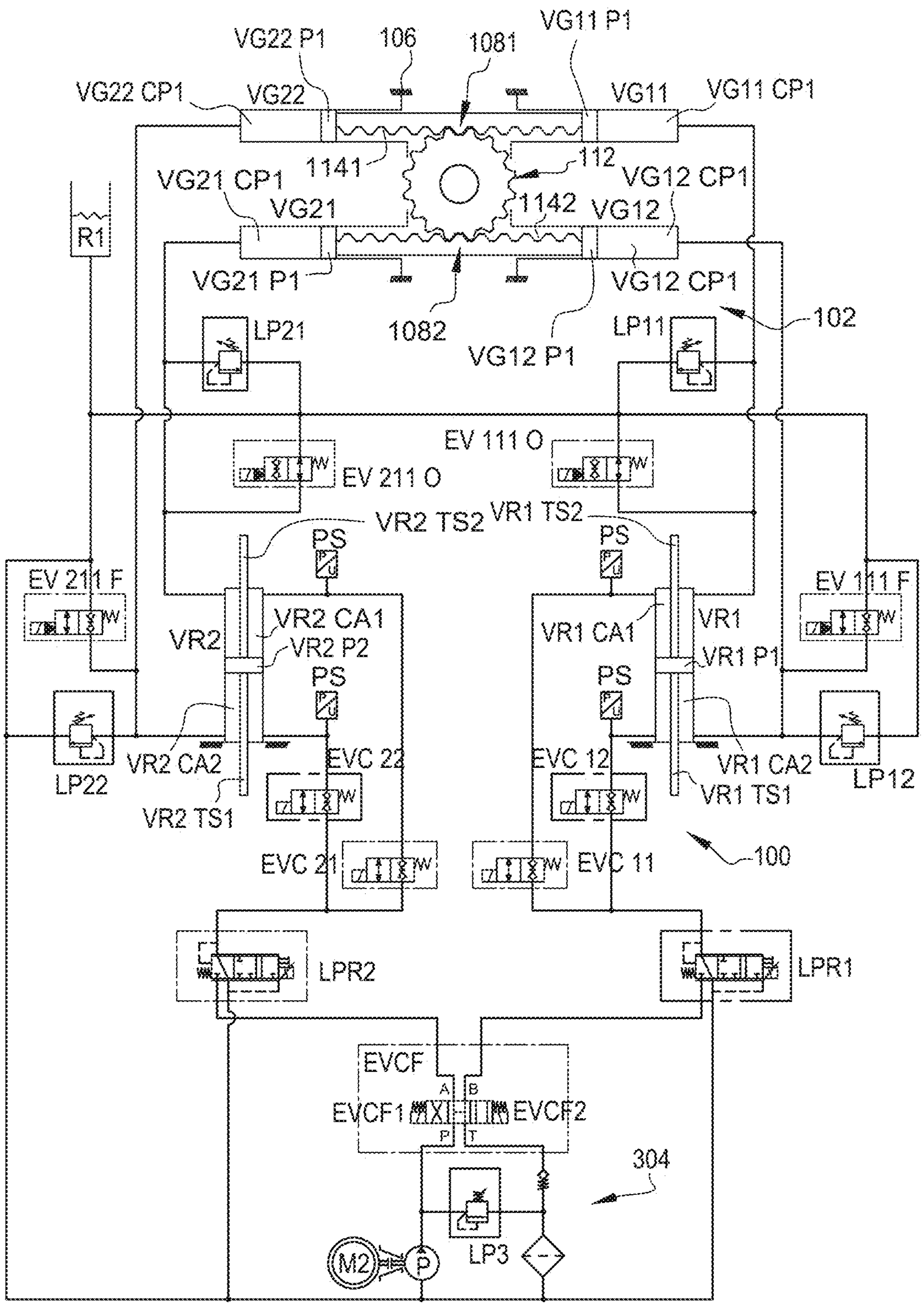
FIG. 7 is a schematic representation of a sixth example of a hydraulic system according to the invention comprising a hydromechanical device according to the invention.

Sixth "Specific Embodiment with Flow Rate Division and Two Receiving Cylinders with Offset Load" of the Invention In this example according to FIG. 7, it is a question of being able to control, in particular simultaneously and "in parallel", each of two receiving cylinders VR1, VR2; each being a double-action double-rod cylinder with two identical opposing active chambers VR1CA1-VR2CA1, VR2CA1-VR2CA2, and with a double output rod VR1TS1-VR1TS2, VR2TS1, VR2TS2, respectively.

In order, for example, to be able to supply simultaneously, and in a synchronized manner, the two first active chambers VR1CP1 and VR2CP1 (so as to "raise" the two first output rods VR1TS1 and VR2TS1 when considering FIG. 7) or, conversely, the two second active chambers VR1CP2 and VR2CP2 (so as to "lower" the two second output rods VR1TS2 and VR2TS2 when considering FIG. 7), the hydromechanical device 102 comprises four identical single-action generating cylinders, among which:

- a generating cylinder VG11 whose output is connected to the first active chamber VR1CP1 of the first receiving cylinder VR1;
- a generating cylinder VG12 whose output is connected to the second active chamber VR1CP2 of the first receiving cylinder VR1;
- a generating cylinder VG21 whose output is connected to the first active chamber VR2CP1 of the second receiving cylinder VR2;
- and a generating cylinder VG22 whose output is connected to the second active chamber VR2CP2 of the second receiving cylinder VR2.

The two generating cylinders VG11 and VG22 are aligned, and their movement input rods VG11TE1 and VG22TE1 are "coupled" by being linked in axial translation by means of a first carriage 1081.

Thus, the linear displacement of the carriage 1081 in one or other direction S1 or S2 causes the simultaneous displacement of the two pistons VR11P1 and VR22P1.

The two generating cylinders VG12 and VG21 are aligned, and their movement input rods VG12TE1 and VG21TE1 are "coupled" by being linked in axial translation by means of a second carriage 1082.

The two carriages 1081 and 1082 have parallel linear displacements.

Thus, the linear displacement of the carriage 1082 in one or other direction S1 or S2 causes the simultaneous displacement of the two pistons VG12P1 and VG21P1.

According to another formulation, it can be considered that the combination of the two coupled generating cylinders VG11-VG22 (or VG12-VG21) constitutes a generating cylinder with two opposing passive chambers VG11CP1-VG22CP1 (or VG12CP1-VG21CP1).

For driving the two carriages 1081 and 1082 simultaneously and in opposite directions, by way of non-limiting example, each carriage here comprises a rack 1141, 1142 which cooperates with a common drive pinion 112.

As in the preceding examples, for driving the pinion 112 in rotation, an assembly 110 (not shown in FIG. 7) may comprise an electric motor M1 which is equipped with an electronic speed variator and whose output shaft is connected in rotation to the screw 112 by means of a mechanical reduction gear 116 with a variable transmission ratio.

Two pairs of passive chambers are thus available that operate in opposition to enable simultaneous operation of the two receiving cylinders VR1 and VR2.

The synchronization of the drive is achieved by injecting identical liquid flow rates, varying at most 1% for 200 bar (compressibility rate of the hydraulic mineral oil in the chambers of the coupled generating cylinders).

The passive chamber VG11CP1 is connected to the chamber VR1CA1, and the injection of pressurized liquid is controlled by means of a pair of solenoid valves EV111O and EV111F.

The passive chamber VG21CP1 is connected to the chamber VR2CA1, and the injection of pressurized liquid is controlled by means of a pair of solenoid valves EV211O and EV211F.

The passive chamber VG12CP1 is connected to the chamber VR1CA2, and the injection of pressurized liquid is controlled by means of the pair of solenoid valves EV111O and EV111F.

The passive chamber VG22CP1 is connected to the chamber VR2CA2, and the injection of pressurized liquid is controlled by means of a pair of solenoid valves EV211O and EV211F. Pressure sensors PS are associated with each of the active chambers of the two receiving cylinders VR1, VR2.

In order to compensate for the variations and deviations due to the compressibility of the pressurized liquid, a complementary hydraulic unit 304 is provided in the system 100, its general design being similar to that of the hydraulic unit 204 described above.

The hydraulic unit 304 can comprise an independent tank or else, as is shown, can be connected to the tank R1 in which there aspirates a pump P driven by an electric motor M3. The output of the pump P is connected to an inlet port of a control solenoid valve EVCF. The solenoid valve EVCF is of the 4-way/3-position type which is a normally closed switch and which is able to be controlled to either of two opposite active positions.

The hydraulic unit 304 can be controlled and operated by varying the value of the output pressure of the pump P in a controlled manner and/or by controlling the solenoid valve EVCF between its central "closed" rest position and either of its two opposite "open" active positions, in each of which it permits the supply of pressurized liquid to one and/or another of the four active chambers VR1CA1, VR1CA2, VR2CA1, VR2CA2 of the receiving cylinders VR1, VR2.

For compensation in the active chambers of the receiving cylinder VR1, via the solenoid valve EVCF, the output of the pump P is connected to a 3-way pressure reducer LPR1 (combination of a relief valve and a pressure reducer allowing a constant pressure to be maintained regardless of the direction of displacement of the receiving cylinder) whose output can be connected in a controlled manner to either of the two active chambers VR1CA1 or VR1CA2 by means of two controlled solenoid valves EVC11 and EVC12.

For compensation in the active chambers of the receiving cylinder VR2, via the solenoid valve EVCF, the output of the pump P is connected to a 3-way pressure reducer LPR2 (combination of a relief valve and a pressure reducer allowing a constant pressure to be maintained regardless of the direction of displacement of the receiving cylinder) whose output can be connected in a controlled manner to either of the two active chambers VR2CA1 or VR2CA2 by means of two controlled solenoid valves EVC21 and EVC22.

TABLE 6

| Solenoid valve (0 = rest) (1 = actuated) | Synchronized rise VR1 and VR2 | Synchronized lowering VR1 and VR2 VR1CA1 and CR2CA2 | Reset VG11, 12, 21, 22 and VR1, 2 |
|---|---|---|---|
| EVCF1 | 1 or 0 | 1 or 0 | 0 |
| EVCF2 | 1 or 0 | 1 or 0 | 0 |
| LPR1F | 1 or 0 | 1 or 0 | 0 |
| LPR2F | 1 or 0 | 1 or 0 | 0 |
| EVC21F | 1 | 0 | 0 |
| EVC22F | 0 | 1 or 0 | 0 |
| EVC11F | 1 | 0 | 0 |
| EVC12F | 0 | 1 or 0 | 0 |
| EV111F | 0 | 1 or 0 | 1 |
| EV111O | 1 or 0 | 1 | 0 |
| EV211O | 1 or 0 | 1 | 0 |
| EV211F | 0 | 1 or 0 | 1 |

This device of complementary hydraulic unit 304/control solenoid valve EVCF/the two 3-way pressure reducers LPR1, LPR2/the four controlled solenoid valves EVC11, EVC12, EVC21 and ECV22 has the function, if necessary, of applying a counter-pressure in the chambers VR2CA1 or VR1CA1 with a value corresponding to the imbalance of the values of the pressures read by the sensors PS between the chambers VR2CA and VR1CA2 (this imbalance corresponding to the imbalance of the loads on the cylinders VR1 and VR2 causing a pressure variation).

The value of the pressure difference compared between the chambers VR2CA and VR1CA2 is applied via the 3-way pressure reducer LPR1 or LPR2 and the controlled solenoid valve EVC11 or EVC21 to either of the chambers VR2CA1 or VR1CA1, generating a force (pressure/section relationship) making it possible to balance the system and thus counteract the compressibility phenomenon; this correction operates in both directions of displacement of the two cylinders VR1 and VR2 (raising of the rods and lowering of the rods).

Industrial Embodiment of the Hydromechanical Assembly 102

Figure 8:
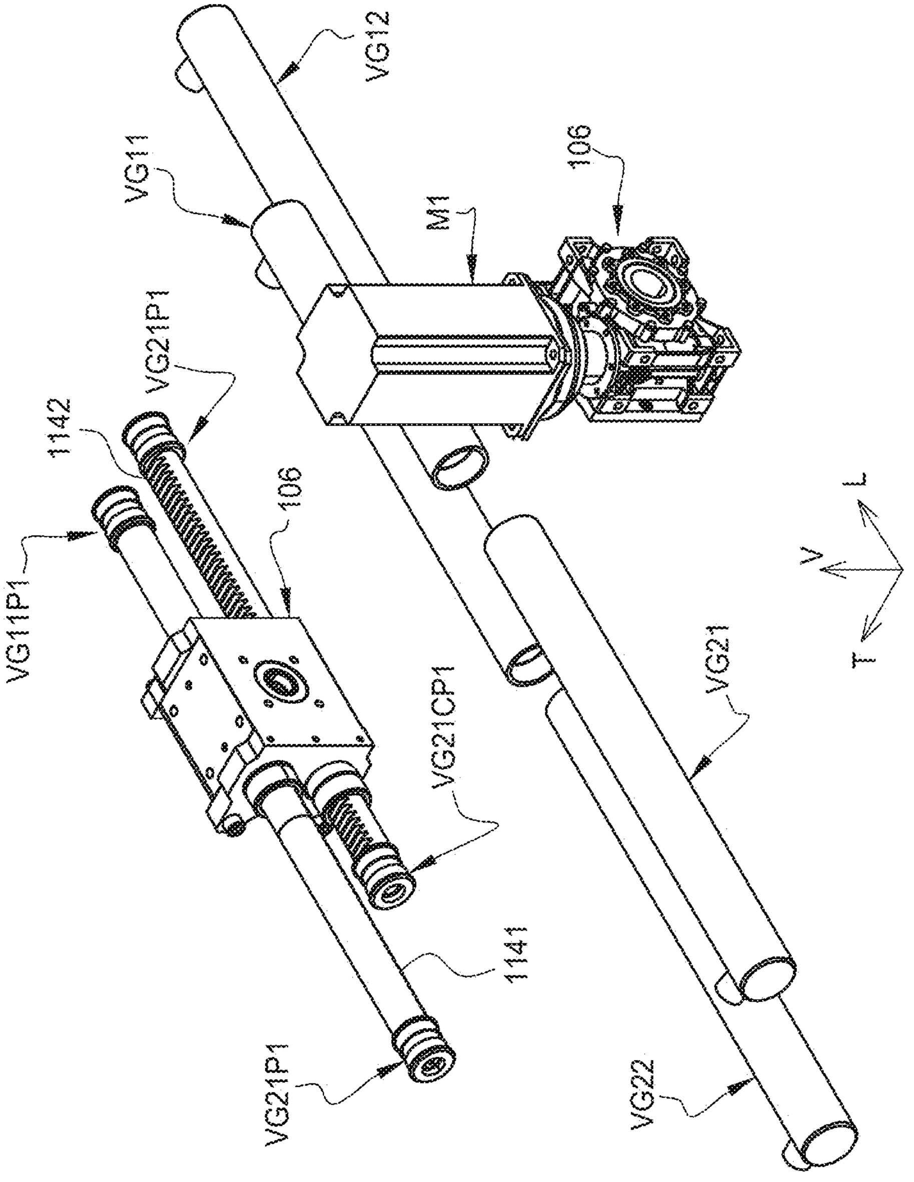
FIG. 8 is a partially exploded perspective representation of an industrial embodiment of the hydromechanical device of FIG. 7.

FIG. 8 shows an exemplary embodiment of a hydromechanical device 102 of the type described above with reference to the schematic representation given in FIG. 7.

All of the fixed components constituting the frame 106 are designated by the same general reference 106.

The frame 106 is thus composed essentially of a housing for guiding and driving the racks 1141 and 1142 and of a reduction gear which carries the motor M1 on its upper face.

The racks are slidably guided in the housing 106, each of them, at its free end, carrying a piston which is received with leaktight sliding in an associated cylinder body.

Figure 9:
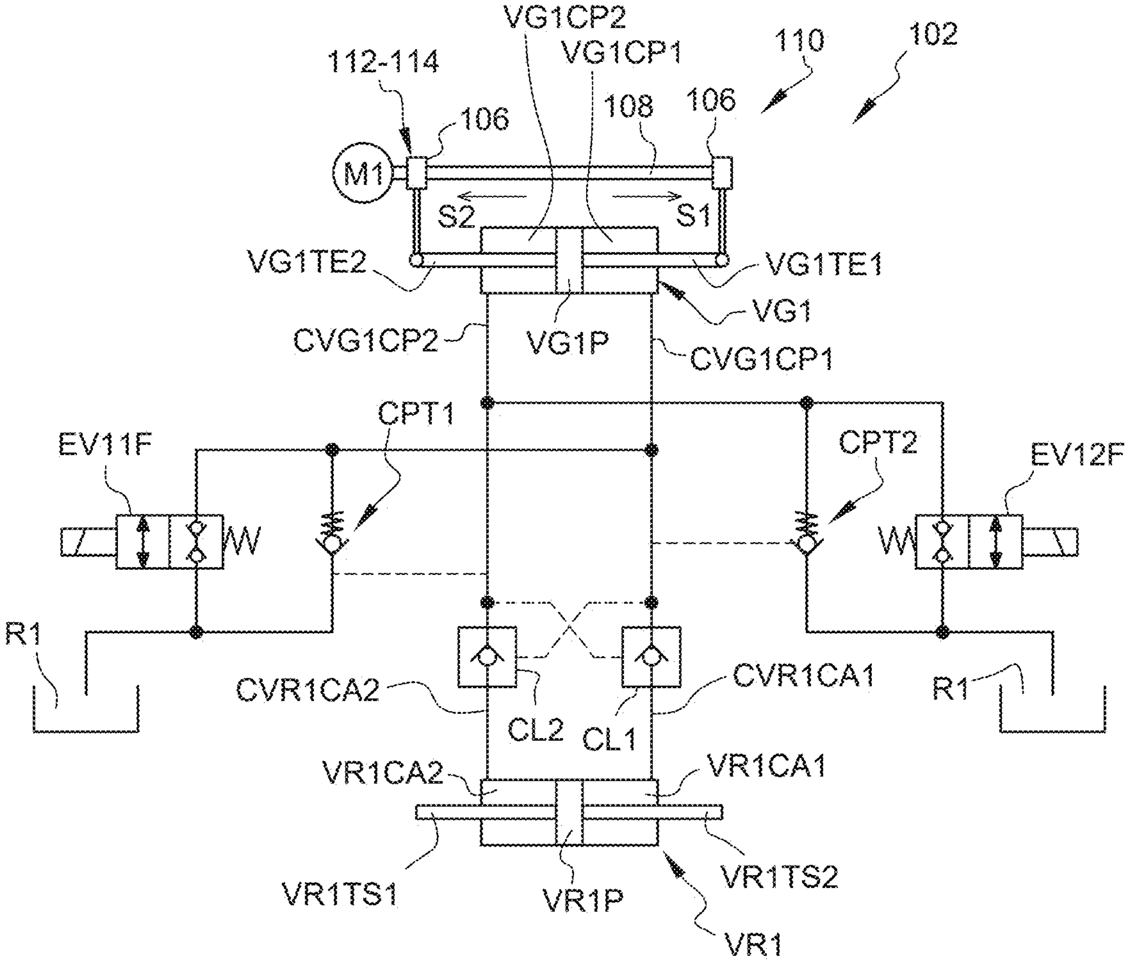
FIG. 9 is a schematic representation of a seventh example of a hydraulic system according to the invention comprising a hydromechanical device according to the invention.

Seventh Simplified Embodiment of the Invention with a Single Receiving Cylinder and a Single Generating Cylinder, Each with Two Opposing Chambers FIG. 9 shows another embodiment of a simplified hydraulic system 100 comprising in particular a hydromechanical device 102 according to the invention for feeding a single receiving cylinder VR1 by means of a single generating cylinder VG1.

The hydraulic linear receiving cylinder VR1 is a double-action cylinder comprising two opposing active chambers VR1CA1, VR1CA2 separated by a piston VR1P.

Depending on the supply of the two opposing active chambers, there is servo-control of the position and/or displacement and/or speed and/or force of a first movement output rod VR1TS1 or of a second movement output rod VR1TS2 of the hydraulic linear receiving cylinder VR1, each of which is linked in translation to the piston VR1P.

The hydromechanical device 102 comprises a single hydraulic linear generating cylinder VG1 with two opposing passive chambers VG1CP1 and VG1CP2 separated by a piston VG1P.

The generating cylinder VG1 comprises a first movement input rod VG1TE1 and a second movement input rod VG1TE2, each of which is integral in translation with the piston VG1P. Each of the two opposing passive chambers VG1CP1, VG1CP is connected to an associated chamber VR1CA1, VR1CA2 of the two opposing active chambers of the hydraulic linear receiving cylinder VR1, respectively, by means of a duct CVG1CP1-CVR1CA1, CVG1CP2-CVR1CA2, respectively.

The hydromechanical device also comprises an assembly 102 for simultaneously driving the first movement input rod VG1TE1 and the second movement input rod VG1TE2 of the double-action hydraulic linear generating cylinder VG1 comprising a mechanical movement transformation assembly, in particular a screw-nut assembly 112, 114 (not shown in detail in this figure), of which one movement output component is integral in axial translation with the two movement input rods of the hydraulic linear generating cylinder VG1, and of which the other movement input component 112 is driven in rotation by a drive motor M1.

Each of the two opposing passive chambers VG1CP1, VG1CP2 is connected to an associated active chamber VR1CA1, VR1CA2 of the hydraulic linear receiving cylinder VR1, with interposition of an associated controlled non-return valve CL1, CL2 whose function is to hold the receiving cylinder VR1 in position.

The opening of each valve CL1, CL2 depends on the pressure prevailing in the other of the two opposing passive chambers VG1CP2, VG1CP1.

Thanks to the presence of these two valves, the compressibility of the liquid contained in the other of the two opposing passive chambers VG1CP2, VG1CP1 is automatically taken into account.

Upstream of the controlled non-return valves CP1, CP2, each of the two opposing passive chambers VG1CP1, VG1CP2 is connected to the atmospheric pressure prevailing here in a tank R1, with interposition of a calibrated controlled non-return valve CPT1, CPT2.

Thanks to the presence of the two calibrated controlled non-return valves CPT1, CPT2, the compressibility of the liquid contained in the other of the two opposing passive chambers VG1CP2, VG1CP1 is automatically taken into account.

Similarly, each of the two opposing passive chambers VG1CP1, VG1CP2 is connected to the tank R1 with interposition via a solenoid valve or a controlled electrodirectional valve EV11F, EV12F, the status of which permits a reset of the cycle start position of the generating cylinder VG1 in relation to the receiving cylinder VR1.

For the hydraulic protection of the circuit, it is possible, for example, to provide a first pressure limiter (not shown) interposed in the duct CVG1CP1 and a second pressure limiter (not shown) interposed in the duct CVG1CP2.

Variant

According to a variant (not shown), whatever the example concerned, it is possible, for driving the screw 112 in rotation, to interpose a gear box, for example a mechanical gear box, between the motor M1 (which is, for example, a brushless motor equipped with an electronic speed variator that allows the speed and torque to be adjusted) and the screw 112.

This variant makes it possible to multiply the possible combinations of step-down and step-up gearing in order to have very slow to very rapid displacements of the receiving cylinder.

The invention claimed is:

1. A hydraulic system, wherein the hydraulic system comprises:

at least one double-action hydraulic linear receiving cylinder comprising at least one first movement output rod capable of applying stresses to a structure;

a hydromechanical device adapted for supplying pressurized liquid to each of two opposing active chambers of the double-action hydraulic linear receiving cylinder for servo-control of a position and/or displacement and/or speed and/or force of at least one first movement output rod of the hydraulic linear receiving cylinder; and a set of (i) hydraulic ducts connecting the associated two first opposing passive chambers and the two opposing active chambers, and (ii) solenoid valves for controlling the circulation of the liquid through said hydraulic ducts, wherein the hydromechanical device comprises:

a first double-action hydraulic linear generating cylinder comprising a first movement input rod, the first movement input rod being integral with a first piston, the first piston delimiting two first opposing passive chambers, each of the two first opposing passive chambers being able to be selectively connected to at least one of the two opposing active chambers of the hydraulic linear receiving cylinder;

an assembly for driving the first movement input rod of the first double-action hydraulic linear generating cylinder, the assembly comprising a mechanical movement transformation assembly, the mechanical movement transformation assembly comprising a first movement output component and a second movement output component, the first movement output component being integral in axial translation with the first movement input rod of the first double-action hydraulic linear generating cylinder, and the second movement output component being driven in rotation by a drive motor; and at least one second double-action hydraulic linear generating cylinder comprising a second movement input rod, the second movement input rod being integral with a second piston, the second piston delimiting two second opposing passive chambers, each of the second opposing passive chambers being able to be selectively connected to at least one of the two opposing active chambers of the hydraulic linear receiving cylinder, wherein the first movement output component is also integral in axial translation with the second movement input rod of the second double-action hydraulic linear generating cylinder so as to axially drive the first input rod and the second input rod simultaneously and in opposite directions, wherein the hydraulic system comprises a complementary hydraulic unit comprising a controlled source of pressurized liquid, an output of the complementary hydraulic unit being able to be selectively connected to at least one of the two opposing active chambers of the hydraulic linear receiving cylinder.

2. The hydraulic system as claimed in claim 1, wherein the hydromechanical device further comprises:

a third double-action hydraulic linear generating cylinder comprising a third movement input rod, the third movement input rod being integral with a third piston, the third piston delimiting two third opposing passive chambers, each of the third opposing passive chambers being able to be selectively connected to at least one of the two opposing active chambers of the hydraulic linear receiving cylinder; and a fourth double-action hydraulic linear generating cylinder comprising a fourth movement input rod, the fourth movement input rod being integral with a fourth piston, the fourth piston delimiting two fourth opposing passive chambers, each of the fourth opposing passive chambers being able to be selectively connected to at least one of the two opposing active chambers of the hydraulic linear receiving cylinder;

wherein the movement output component is also integral in axial translation with the third movement input rod of the third double-action hydraulic linear generating cylinder so as to axially drive the first input rod and the third input rod simultaneously and in identical directions; and wherein the movement output component is also integral in axial translation with the fourth movement input rod of the fourth double-action hydraulic linear generating cylinder so as to axially drive the second input rod and the fourth input rod simultaneously and in identical directions.

3. The hydraulic system as claimed in claim 2, wherein:

an effective area of the third piston is greater than an effective area of the first piston and a unit volume displaced by the third piston of the third hydraulic linear generating cylinder in the third passive chamber is greater than a unit volume displaced by the first piston of the first hydraulic linear generating cylinder in the first passive chamber; and an effective area of the fourth piston is greater than an effective area of the second piston and a unit volume displaced by the fourth piston of the fourth hydraulic linear generating cylinder in the fourth passive chamber is greater than a unit volume displaced by the second piston of the second hydraulic linear generating cylinder in the second passive chamber.

4. The hydraulic system as claimed in claim 1, wherein the drive motor is an electric motor associated with a mechanical reduction gear having a variable transmission ratio and/or a frequency variator.

5. The hydraulic system as claimed in claim 1, wherein the mechanical movement transformation assembly is a screw nut assembly.

6. A hydromechanical device for supplying pressurized liquid to each of two opposing active chambers of a double-action hydraulic linear receiving cylinder for servo-control of the position and/or displacement and/or speed and/or force of at least one first movement output rod of the hydraulic linear receiving cylinder, wherein the hydromechanical device comprises:

a hydraulic linear generating cylinder having two opposing passive chambers comprising a first movement input rod and a second movement input rod, each of the first and second movement input rods being integral with a piston which delimits the two opposing passive chambers each of the two opposing passive chambers being connected to an associated chamber of the two opposing active chambers of the hydraulic linear receiving cylinder; and an assembly for simultaneously driving the two movement input rods of the double-action hydraulic linear generating cylinder comprising a mechanical movement transformation assembly, the mechanical movement transformation assembly comprising a first movement output component and a second movement output component, the first movement output component being integral in axial translation with the two movement input rods of the hydraulic linear generating cylinder having two opposing chambers, and the second movement input component being driven in rotation by a drive motor, wherein (i) each of the two opposing passive chambers is connected to the associated chamber of the two opposing active chambers of the hydraulic linear receiving cylinder, with interposition of an associated single non-return valve, opening of the associated single non-return valve being dependent on the pressure prevailing in the other of the two opposing passive chambers, so as to take into account the compressibility of the liquid contained in the other of the two opposing passive chambers, and/or (ii) each of the two opposing passive chambers is connected to atmospheric pressure with interposition of a calibrated non-return valve, and/or (iii) each of the two opposing passive chambers is connected to atmospheric pressure via a solenoid valve or a controlled electrodirectional valve, a status of the solenoid valve or controlled electrodirectional valve permitting a reset of the cycle start position of the generating cylinder in relation to the receiving cylinder.

7. The device as claimed in claim 6, wherein each of the two opposing passive chambers is connected to the associated chamber of the two opposing active chambers of the hydraulic linear receiving cylinder, with interposition of the associated single non-return valve, opening of the associated single non-return valve being dependent on the pressure prevailing in the other of the two opposing passive chambers, so as to take into account the compressibility of the liquid contained in the other of the two opposing passive chambers.

8. The device as claimed in claim 6, wherein each of the two opposing passive chambers is connected to atmospheric pressure with interposition of the calibrated non-return valve.

9. The device as claimed in claim 6, wherein each of the two opposing passive chambers is connected to atmospheric pressure via the solenoid valve or the controlled electrodirectional valve, the status of the solenoid valve or controlled electrodirectional valve permitting a reset of the cycle start position of the generating cylinder in relation to the receiving cylinder.

10. The device as claimed in claim 6, wherein the drive assembly acts on the piston, the piston delimiting the two opposing passive chambers in order to simultaneously drive the first movement input rod and the second movement input rod.

11. The device as claimed in claim 6, wherein the mechanical movement transformation assembly is a screw nut assembly.

12. A hydromechanical device for supplying pressurized liquid to each of two opposing active chambers of a double-action hydraulic linear receiving cylinder for servo-control of a position and/or displacement and/or speed and/or force of at least one first movement output rod of the hydraulic linear receiving cylinder, wherein the hydromechanical device comprises:

a first double-action hydraulic linear generating cylinder comprising a first movement input rod, the first movement input rod being integral with a first piston, the first piston delimiting two first opposing passive chambers, each of the two first opposing passive chambers being able to be selectively connected to at least one of the two opposing active chambers of the hydraulic linear receiving cylinder;

an assembly for driving the first movement input rod of the first double-action hydraulic linear generating cylinder, the assembly comprising a mechanical movement transformation assembly, the mechanical movement transformation assembly comprising a first movement output component and a second movement output component, the first movement output component being integral in axial translation with the first movement input rod of the first double-action hydraulic linear generating cylinder, and the second movement output component being driven in rotation by a drive motor; and at least one second double-action hydraulic linear generating cylinder comprising a second movement input rod, the second movement input rod being integral with a second piston, the second piston delimiting two second opposing passive chambers, each of the second opposing passive chambers being able to be selectively connected to at least one of the two opposing active chambers of the hydraulic linear receiving cylinder, wherein the first movement output component is also integral in axial translation with the second movement input rod of the second double-action hydraulic linear generating cylinder so as to axially drive the first input rod and the second input rod simultaneously and in opposite directions, wherein:

an effective area of the third piston is greater than an effective area of the first piston and a unit volume displaced by the third piston of the third hydraulic linear generating cylinder in the third passive chamber is greater than a unit volume displaced by the first piston of the first hydraulic linear generating cylinder in the first passive chamber; and an effective area of the fourth piston is greater than an effective area of the second piston and a unit volume displaced by the fourth piston of the fourth hydraulic linear generating cylinder in the fourth passive chamber is greater than a unit volume displaced by the second piston of the second hydraulic linear generating cylinder in the second passive chamber.

13. The hydromechanical device as claimed in claim 12, wherein:

an effective area of the third piston is greater than an effective area of the first piston and a unit volume displaced by the third piston of the third hydraulic linear generating cylinder in the third passive chamber is greater than a unit volume displaced by the first piston of the first hydraulic linear generating cylinder in the first passive chamber; and an effective area of the fourth piston is greater than an effective area of the second piston and a unit volume displaced by the fourth piston of the fourth hydraulic linear generating cylinder in the fourth passive chamber is greater than a unit volume displaced by the second piston of the second hydraulic linear generating cylinder in the second passive chamber.

14. The hydromechanical device as claimed in claim 12, wherein the mechanical movement transformation assembly is a screw nut assembly.

15. A hydromechanical device for supplying pressurized liquid to each of two opposing active chambers of a double-action hydraulic linear receiving cylinder for servo-control of a position and/or displacement and/or speed and/or force of at least one first movement output rod of the hydraulic linear receiving cylinder, wherein the hydromechanical device comprises:

a first double-action hydraulic linear generating cylinder comprising a first movement input rod, the first movement input rod being integral with a first piston, the first piston delimiting two first opposing passive chambers, each of the two first opposing passive chambers being able to be selectively connected to at least one of the two opposing active chambers of the hydraulic linear receiving cylinder;

an assembly for driving the first movement input rod of the first double-action hydraulic linear generating cylinder, the assembly comprising a mechanical movement transformation assembly, the mechanical movement transformation assembly comprising a first movement output component and a second movement output component, the first movement output component being integral in axial translation with the first movement input rod of the first double-action hydraulic linear generating cylinder, and the second movement output component being driven in rotation by a drive motor; and at least one second double-action hydraulic linear generating cylinder comprising a second movement input rod, the second movement input rod being integral with a second piston, the second piston delimiting two second opposing passive chambers, each of the second opposing passive chambers being able to be selectively connected to at least one of the two opposing active chambers of the hydraulic linear receiving cylinder, wherein the first movement output component is also integral in axial translation with the second movement input rod of the second double-action hydraulic linear generating cylinder so as to axially drive the first input rod and the second input rod simultaneously and in opposite directions, wherein the drive motor is an electric motor associated with a mechanical reduction gear having a variable transmission ratio and/or a frequency variator.

16. The hydromechanical device as claimed in claim 15, wherein the hydromechanical device further comprises:

a third double-action hydraulic linear generating cylinder comprising a third movement input rod, the third movement input rod being integral with a third piston, the third piston delimiting two third opposing passive chambers, each of the third opposing passive chambers being able to be selectively connected to at least one of the two opposing active chambers of the hydraulic linear receiving cylinder; and a fourth double-action hydraulic linear generating cylinder comprising a fourth movement input rod, the fourth movement input rod being integral with a fourth piston, the fourth piston delimiting two fourth opposing passive chambers, each of the fourth opposing passive chambers being able to be selectively connected to at least one of the two opposing active chambers of the hydraulic linear receiving cylinder;

wherein the movement output component is also integral in axial translation with the third movement input rod of the third double-action hydraulic linear generating cylinder so as to axially drive the first input rod and the third input rod simultaneously and in identical directions; and wherein the movement output component is also integral in axial translation with the fourth movement input rod of the fourth double-action hydraulic linear generating cylinder so as to axially drive the second input rod and the fourth input rod simultaneously and in identical directions.

17. The hydromechanical device as claimed in claim 16, wherein:

an effective area of the third piston is greater than an effective area of the first piston and a unit volume displaced by the third piston of the third hydraulic linear generating cylinder in the third passive chamber is greater than a unit volume displaced by the first piston of the first hydraulic linear generating cylinder in the first passive chamber; and an effective area of the fourth piston is greater than an effective area of the second piston and a unit volume displaced by the fourth piston of the fourth hydraulic linear generating cylinder in the fourth passive chamber is greater than a unit volume displaced by the second piston of the second hydraulic linear generating cylinder in the second passive chamber.

18. The hydromechanical device as claimed in claim 15, wherein the mechanical movement transformation assembly is a screw nut assembly.

* * * * *